Patented Apr. 2, 1929.

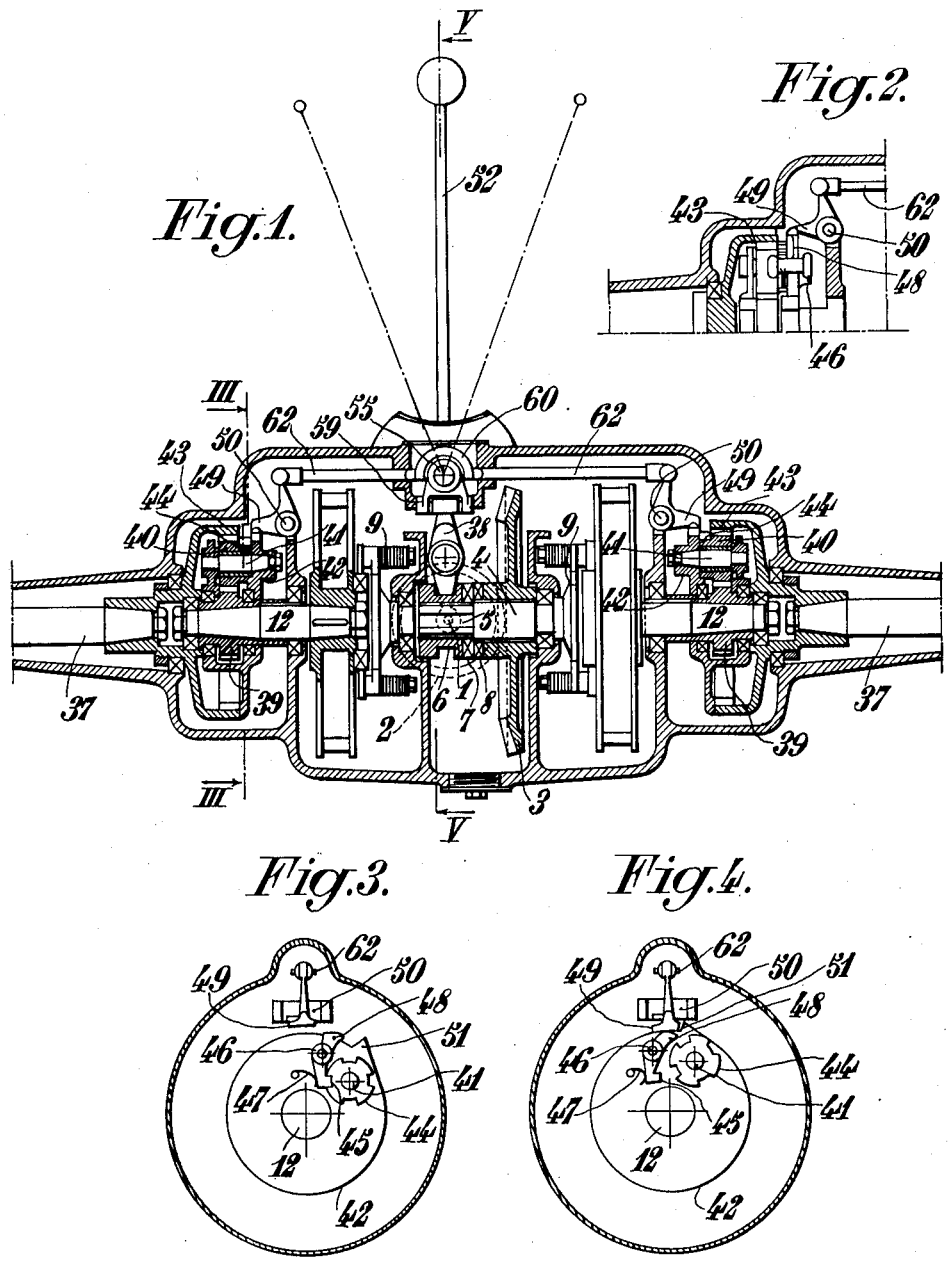

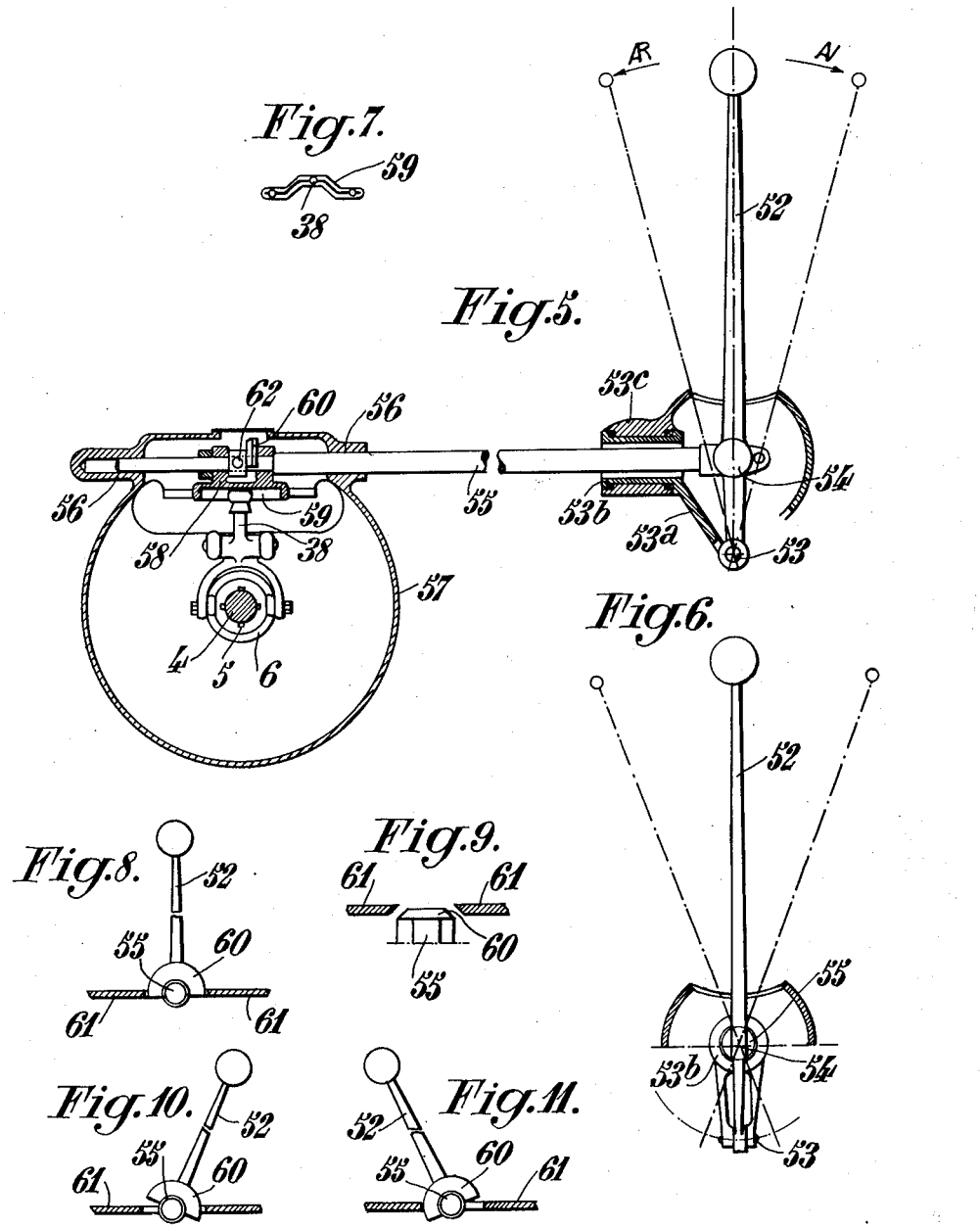

1,707,393

UNITED STATES PATENT OFFICE.

NICOLAS GHERASSIMOFF, OF LE VESINET, FRANCE.

POWER-TRANSMITTING MECHANISM FOR AUTOMOBILES AND OTHER PURPOSES.

Original application filed October 26, 1925, Serial No. 65,022, and in France March 21, 1925. Divided and this application filed May 29, 1926. Serial No. 112,695.

The present invention (for which I have made application for Letters Patent in France, filed March 21, 1925, No. 598,027) relates to a power-transmitting mechanism which, although more especially intended for use with automobiles, can however be used for other purposes.

The present application is a division of my application filed October 26, 1925, Serial No. 65,022.

The present invention relates to a mechanism by which it is possible to so control the driving wheels of an automobile that simultaneously one wheel is adapted to effect forward running, whilst the other wheel is adapted to effect rearward running, thus enabling the automobile to readily take very sharp curves. Both these results can be achieved, irrespective of the result usually accomplished when both driving wheels are made to propel the vehicle either forward or backward, at will.

Certain portions of the specification and drawings of the initial application, Serial No. 65,022 are embodied in the following description of the mechanism according to the present invention, without which portions the said mechanism could not be clearly understood. No claim is, however, made for the said portions in the present application.

The accompanying drawings show a power-transmission device constructed according to the present invention, fitted to the driving mechanism of an automobile.

In the drawings:

Fig. 1 is a sectional elevation of a power-transmitting mechanism embodying the invention.

Fig. 2 is a view of a portion of Fig. 1, on a larger scale, some of the parts being shown in a different position.

Fig. 3 is a cross-section along the line III—III of Figure 1.

Fig. 4 is a view similar to Figure 3, with the parts shown in a different position.

Fig. 5 is a cross-section along the line V, V of Figure 1.

Fig. 6 is an elevation taken at right angles to Fig. 5, some of the parts being omitted.

Fig. 7 is an underface view of the cam 59 shown in Fig. 5.

Figs. 8, 9, 10 and 11 are details of certain parts of Fig. 5 in different positions.

In Fig. 1, 1 designates the shaft of an internal combustion engine, the transmission being assumed to be incorporated in the mechanism of an automobile. Upon this shaft is mounted a bevel pinion 2 (shown in dotted lines), meshing with a toothed crown 3 loosely mounted on the driving shaft 4. A clutch-sleeve 6 is slidably mounted upon the grooved portion 5 of this shaft and the claws 7 of this clutch can engage other claws 8 formed on the tooth crown 3, so that, as desired, said crown 3 can be connected to or disconnected from the shaft 4.

The driving shaft 4 communicates its rotary movement to each of the two rear wheels of the vehicle through the intermediary of devices which are identical for each wheel. In consequence, it will be sufficient to describe the devices actuating one of these wheels alone, it being understood that the same devices are provided, arranged symmetrically as shown, for the actuation of the other wheel.

On the extremity of the driving shaft 4 there is keyed a disc 9 which is connected to and actuates an intermediate shaft 12, through the instrumentality of an elastic connection which may be of any known suitable construction, but preferably that shown in my application Serial No. 65,022.

On the extremity of the intermediate shaft 12 is keyed a toothed pinion 39 constantly in engagement with a satellite 40 mounted upon a shaft 41 fixed upon a supporting crown 42. The supporting crown 42 is rotatably mounted on the intermediate shaft 12 and satellite 40 meshes with an internally toothed crown 43 keyed upon the driven shaft or axle 37 of the wheel of the automobile. It will be understood that, if the satellite 40 is free to rotate upon its axis 41 and if the supporting crown 42 is held against rotation, said satellite will impart, to the driven shaft or axle 37, a rotary motion in the opposite direction to that of the intermediate shaft 12. If, on the other hand, the satellite is held against rotation on its axis and the supporting crown 42 is free to rotate, the entire device will form a sort of clutch-sleeve which will drive the shaft 37 with a rotary action in the same direction as that of the shaft 4.

The means provided for obtaining this reversal of direction comprise a locking ratchet 44, Figs. 1, 3, 4, fixed to the satellite 40 and the teeth of which may be engaged by the nose of a pawl 45 pivoted at 46 on the supporting crown 42 and pressed by a spring 47. This pawl 45 has a tail 48 upon which a lever 49, pivoted at 50 on the supporting casing, may act in such a manner as to rock said pawl, this lever 49 being actuated as will be described below.

When the lever 49 is in its highest position, (position shown in Fig. 3), the spring 47 causes the pawl 45 to engage and lock the satellite against rotation. Consequently, as described above, the wheel axle 37 rotates in the same direction as the shaft 12. This represents forward running. When the lever 49 is in its lowermost position (Fig. 4), it acts upon the pawl 45 and disengages it from the ratchet 44. The satellite 40 can then rotate freely, while the supporting crown is held against movement by the abutment of a shoulder 51 on the periphery of the supporting crown against the lever 49. The satellite will then drive the toothed crown 43 and the wheel axle 37 will rotate in a direction opposite to that of the shaft 4. This represents rearward running.

The foregoing description covers those portions of the specification and drawings of the initial application, Serial No. 65,022 as had to be given prior to describing the present invention.

According to the present invention, there is provided, as hereinbefore stated, a device which renders it possible to simultaneously control on the one hand, the actuation of the clutch sleeve 6 and, on the other hand, the actuation of the levers 49. As will be remembered, the claws 7 of this sliding sleeve 6 act, when engaged in the claws 8 on the toothed crown 3, to fixedly connect the said crown 3 to the shaft 4 or, on the other hand, when disengaged, to release said crown from said shaft, whilst the levers 49 serve to act upon the respective tails 48 of the pawls 45, so as to rock the latter (Fig. 4) and disengage them from the corresponding locking ratchets 44.

This device, which is shown in Figures 5 to 11, comprises an actuating lever 52 which can be oscillated by hand in any desired plane, and which is mounted for this purpose on a universal joint in the known manner. This device enables it to pivot, on the one hand, about the axis 53, Figs. 5, 6 and, on the other hand, in a perpendicular plane about the axis 54. To that end, the arm 53ª, to the extremity of which the said lever 52 is pivoted, is integral with a bushing 53ᵇ adapted to rock loosely in the bracket 53ᶜ, Fig. 5.

Upon this lever 52 there is pivoted a rod 55 which can slide in bearings 56 of a gear-case 57, and upon which there is fixed, facing the lever 38, Figs. 1, 5, 7, a piece 58 provided with a cam groove 59 in which latter the extremity of this lever 38 is lodged.

The profile of this groove which is shown in Fig. 7, is such that, the lever 52, when at the dead centre, whatever may be its direction of movement in the plane of Fig. 10, causes shifting of the sleeve 6 and consequently effects coupling of the sleeve 6 with the crown 3. Upon the rod 55 there is also keyed a cam 60 of conical shape and of semicircular cross-section. This cam, which is shown in detail in Figs. 8 to 11, is adapted to engage the extremities 61 of each of the rods 62 which are pivoted to the levers 49.

This power-transmission mechanism acts as follows: Assuming the parts to be in the position shown in Fig. 1, the clutch-sleeve 6 being in the inoperative position, the rotary movement of the engine shaft 1 will be transmitted by the pinion 2, Fig. 1, to the toothed crown 3 which rotates freely upon the driving shaft 4. If, by means of the actuating lever 38, the claws 7 of the sleeve 6 are caused to engage the claws 8 of the crown 3, this latter will impart motion to the shaft 4 and the disc 9.

If it is desired to effect forward running for both wheels, the hand lever 52 is rocked on its axis 53 in the direction of the arrow AV, Fig. 5. This will move the rod 55 longitudinally and the cam groove 59 will rock the lever 38 and move the claws 7 of the sliding sleeve 6 into engagement with the claws 8 of the toothed crown 3 without actuating the cam 60 and the result is forward running of both wheels, Fig. 3.

If it is desired to obtain rearward running, it is sufficient to rock the lever 52 on its axis 53 in the direction of the arrow AR, Figs. 5 and 6. This effects coupling of the claws 7 and 8 as before, but the cam 60 will engage the adjacent ends of the rods 62 and move said rods longitudinally in opposite directions and thus rock both of the levers 49. The result is rearward running for both wheels. The levers 49 will engage the shoulders 51 of the supporting crowns 42 and simultaneously move the pawls 45 out of engagement with the ratchet teeth 44 of the satellites 40.

If, finally, it is desired to obtain forward-running for one of the wheels, and rearward running for the other, it is sufficient to first of all rock the hand lever 52 on the axis 54 (plane of Fig. 6) either in one direction or in the other, so as to move the cam 60 into the position shown in Fig. 10 or into the position shown in Fig. 11, and then to rock the lever 52 in the direction of the arrow AR of Fig. 10, to cause the cam 60 to act only upon one or the other of the rods 62. In this way one of the wheels is caused to rotate in one direction and the other wheel is caused to rotate in the opposite direction. This arrangement enables very sharp curves to be taken.

I claim:

1. A power transmitting device, comprising a driving shaft; a driven shaft; an intermediate shaft; a clutch operative to clutch said driving shaft to said intermediate shaft; a supporting crown rotatable on the intermediate shaft; a satellite mounted to rotate on said crown on an axis eccentric to the axis of rotation of said crown, a pinion keyed to said intermediate shaft and constantly in mesh with said satellite, an internally toothed crown keyed to said driven shaft and meshing with said satellite; means associated with said first-named crown for normally locking said satellite against rotation on said crown; means including a lever adapted, when rocked in one direction, to move said clutch into operative position and, when rocked in the opposite direction, to release said satellite locking means and lock said first-named crown against rotation on the intermediate shaft.

2. A power transmitting device according to claim 1 wherein the means for releasing the satellite locking means and locking the first-named crown against rotation includes a second lever adapted, when rocked, to engage the satellite locking means and the first-named crown, a longitudinally shiftable rod for rocking said second lever, and a cam operable by the first lever for shifting said rod.

3. A power transmitting device, comprising a driving shaft; a pair of driven shafts; an intermediate shaft between each of said driven shafts and said driving shaft; means for clutching said driving shaft to said intermediate shafts, a transmission mechanism between each of said intermediate shafts and its associated driven shaft, each of said transmission mechanisms comprising a supporting crown normally rotatable on one of said intermediate shafts, a satellite rotatably mounted on said supporting crown eccentric to the axis of rotation of the latter, a pinion keyed to said intermediate shaft and constantly in mesh with said satellite, a crown keyed to the associated driven shaft and having internal teeth meshing with said satellite, and means carried by said first-named crown for normally locking the satellite against rotation on its axis; means associated with each of said supporting crowns for simultaneously locking it against rotation and releasing the locking means of its associated satellite; and selectively operable means for actuating said clutch alone or for actuating said clutch and simultaneously actuating both of said crown-locking and satellite releasing means or for actuating said clutch and simultaneously actuating one of said crown-locking and satellite-releasing means.

4. A power transmitting device according to claim 3 wherein the means carried by each of the first-named crowns for locking its satellite against rotation comprises a ratchet wheel carried by the satellite and a pawl normally engaging said ratchet wheel, and the means for releasing said locking means and locking its supporting crown against rotation comprises a lever adapted when rocked to engage with said pawl and with a projection on such supporting crown.

5. A power transmitting device according to claim 1 wherein the means for actuating the clutch on the rocking movement of the lever in one direction and releasing the satellite locking means and locking the first-named crown against rotation on the rocking movement of the lever in the opposite direction comprises a second lever associated with the clutch, a longitudinally movable rod and a pair of cams carried by said rod, one of said cams being associated with said second lever and the other of said cams being associated with said satellite locking means and crown.

6. A power transmitting device, comprising a driving shaft; a pair of driven shafts; an intermediate shaft between each of said driven shafts and said driving shaft; a clutch for connecting said driving shaft to said intermediate shafts; a transmission mechanism between each of said intermediate shafts and its associated driven shaft, each of said transmission mechanisms comprising a supporting crown normally rotatable on one of said intermediate shafts, a satellite mounted to rotate on said supporting crown on an axis eccentric to the axis of rotation of said supporting crown, a pinion keyed to said intermediate shaft and constantly in mesh with said satellite, a crown keyed to the associated driven shaft and having teeth meshing with said satellite, and means carried by said first-named crown for normally locking the satellite against rotation on its axis; means associated with each of said supporting crowns for simultaneously locking it against rotation and releasing the locking means of the associated satellite; a pair of rods, each associated with one of said crown-locking and satellite-releasing means and longitudinally shiftable for actuating said means; a lever; and means selectively operable by said lever to actuate said clutch alone or to actuate said clutch and shift one or both of said rods.

NICOLAS GHERASSIMOFF.